United States Patent
Akers et al.

(10) Patent No.: US 8,645,150 B2
(45) Date of Patent: Feb. 4, 2014

(54) SOURCE AWARE DATA CENTER POWER PROFILES

(75) Inventors: Jason B. Akers, Portland, OR (US); Ross B. Clay, Raleigh, NC (US); Michael C. Hollinger, Round Rock, TX (US); Ryan A. Holt, Uxbridge, MA (US); Perry L. Jones, Silver Springs, MD (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/758,341

(22) Filed: Apr. 12, 2010

(65) Prior Publication Data

US 2011/0251966 A1  Oct. 13, 2011

(51) Int. Cl.
*G06Q 50/06* (2012.01)
*G06Q 10/08* (2012.01)

(52) U.S. Cl.
CPC ............... *G06Q 50/06* (2013.01); *G06Q 10/08* (2013.01)
USPC .......................................... 705/1.1; 705/342

(58) Field of Classification Search
USPC ........................................................ 705/1.1
See application file for complete search history.

(56) References Cited

U.S. PATENT DOCUMENTS

| | | | |
|---|---|---|---|
| 6,577,962 B1 | 6/2003 | Afshari | |
| 7,541,941 B2* | 6/2009 | Bogolea et al. | 340/870.02 |
| 8,260,682 B2* | 9/2012 | Rigole | 705/26.41 |
| 2006/0142961 A1 | 6/2006 | Johnson et al. | |
| 2007/0050569 A1* | 3/2007 | Haustein et al. | 711/154 |
| 2008/0255899 A1* | 10/2008 | McConnell et al. | 705/7 |
| 2008/0262820 A1 | 10/2008 | Nasle | |
| 2009/0125825 A1 | 5/2009 | Rye et al. | |
| 2009/0157333 A1 | 6/2009 | Corrado et al. | |
| 2009/0195349 A1 | 8/2009 | Frader-Thompson et al. | |
| 2009/0265568 A1 | 10/2009 | Jackson | |
| 2010/0087963 A1* | 4/2010 | Boston et al. | 700/295 |

OTHER PUBLICATIONS

Definition of Carbon Footprint.*
"Power Systems Energy Management", IBM, pp. 1-2, retrieved Jan. 29, 2010 http://www-03.ibm.com/systems/power/software/energy/solutions.html.
"Sentilla Debuts Eenergy Measurement and management Platform for Data Centers", Jan. 27, 2009, Business Wire, 2009, pp. 1-2.
"Energy Efficiency and Waste Minimization", pp. 1-5, retrieved Jan. 29, 2010 http://web.ifac.org/sustainability-framework/imp-energy-efficiency/print.
IBM "Tool to validate energy conservation investments in Data Centers", Jun. 11, 2009, ip.com Prior ArtDatabase Technical Disclosure IPCOM000184115D.

* cited by examiner

*Primary Examiner* — Heidi Kelley
(74) *Attorney, Agent, or Firm* — Yee & Associates, P.C.; Arthur Samodovitz (57) ABSTRACT

Carbon values are provided by vendors of power to data center management and are used by data center management to keep carbon values for energy produced to provide services below service level agreement thresholds. A plurality of vendor carbon values, a plurality of static data, and a plurality of dynamic data are used to calculate a future power consumption and a future operating cost for a data center in a computing service environment. The future operating cost includes a future carbon cost indicating the amount of carbon generated to satisfy the future power consumption.

20 Claims, 8 Drawing Sheets

SOURCE AWARE DATA CENTER POWER PROFILES

BACKGROUND

1. Field

The disclosure relates generally to data center management and more specifically to intelligently assessing the power profile of a data center by accounting for carbon costs of energy.

2. Description of the Related Art

Data centers provide computer resources in support of service level agreements between customers and service providers. Customers enter into service level agreements that specify a cost for the service provided. The cost for the services provided includes the cost of energy to operate the data center and to run the servers and other equipment in accordance with the service level agreement. Customers may look to other factors than a final cost figure. For example, in many industries, customers look for "green solutions," which are services that take into account the environmental impact of providing the services. Some customers prefer to pay more for a "green solution" than for a traditional solution because doing so provides goodwill benefits to the customers' reputation with the public and those who in turn consume the customer's own services.

Data center profiles provide information to management on the number of servers in the data center, the performance of the servers in the data center, and the total power requirements of the data center facility. Data center profiles are useful for determining what workloads may be run on the available servers. However, data center profiles do not provide information for determining the lowest total cost method of running a workload. Current data center profiles do not take into account environmental costs in providing the data center services in support of service level agreements. For example, current data center profiles do not take into account information regarding the source of the power consumed by the data center. For example, the source of the power consumed by the data center could come from a nuclear power plant, a coal burning power plant, a geothermal power plant, a solar farm, a wind farm, or other types of electric energy production. Each type of source may have a particular cost at which it sells its power, but each also has a different environmental impact measurable in terms of the amount of carbon dioxide introduced into the atmosphere to generate a particular amount of energy.

Therefore, it would be desirable to have a method, apparatus, and computer program code that may overcome one or more of the issues described above, as well as other possible issues.

SUMMARY

According to one embodiment of the present invention, a system provides data center services in accordance with an environmental requirement. The system comprises a service oriented architecture comprising a plurality of service level agreements, a plurality of data centers, each of the plurality of data centers having a computing system, the computing system comprising a monitoring agent, a static data interface, and a prediction agent. The monitoring agent acquires a plurality of dynamic data comprising a plurality of workload characteristics, a plurality of current workload data, a plurality of historic power consumption data, a plurality of workload inflow rates, and a plurality of workload outflow rates. The static data interface acquires a plurality of peak rate data, a plurality of power source characteristics, a plurality of data center characteristics, and a plurality of data transport costs. The prediction agent, by one or more processors of the computing system, uses the plurality of power vendor data, the plurality of dynamic data, and the plurality of static data, and calculates a future power consumption and a future operating cost. The future operating cost includes a future carbon cost indicating the amount of carbon associated with satisfying the future power consumption.

BRIEF DESCRIPTION OF THE SEVERAL VIEWS OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
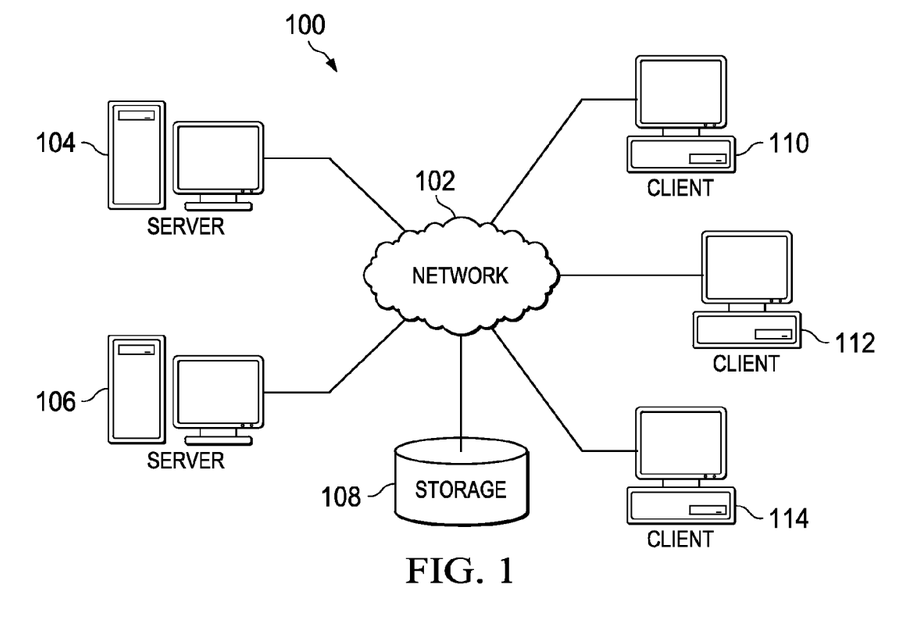
FIG. 1 is a computer network in which illustrative embodiments may be implemented.
Figure 2:
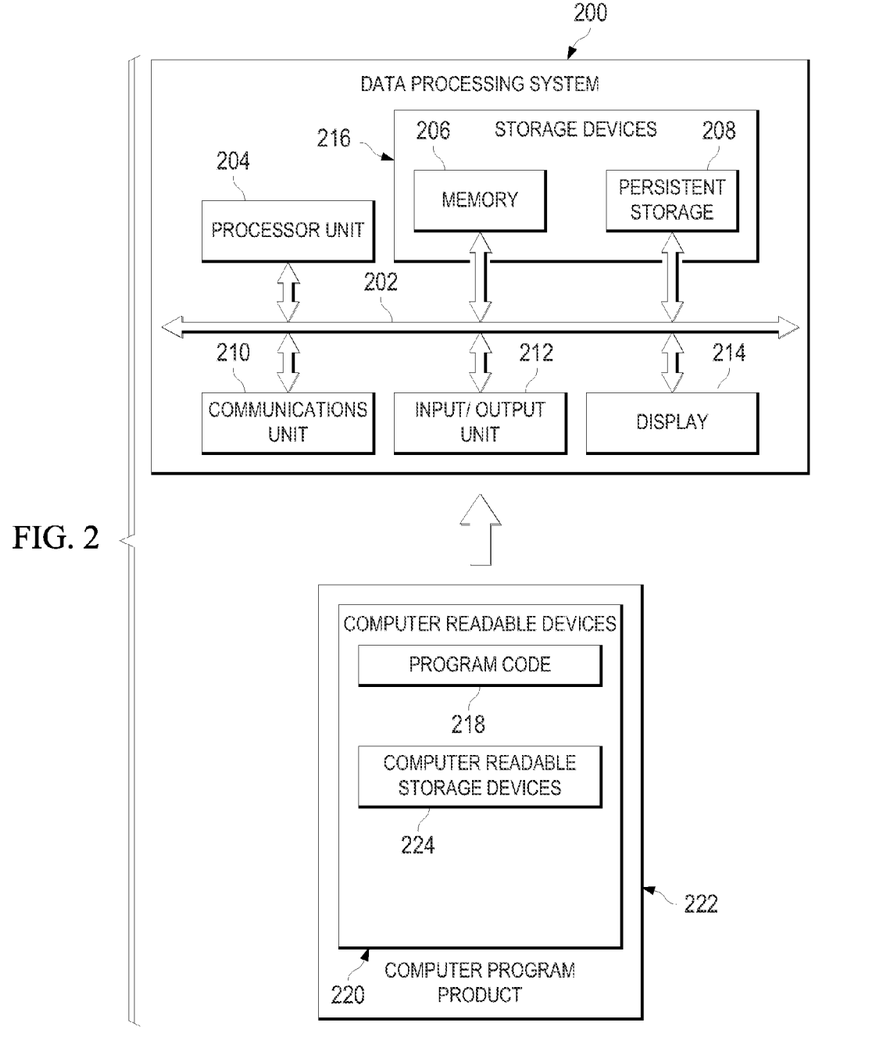
FIG. 2 is data processing system in which illustrative embodiments may be implemented.

With reference now to the figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example.

Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to run instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The device used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code, in the different embodiments, may be embodied on different physical or computer readable storage devices, such as memory 206 or persistent storage 208.

Program code 218 is located in a functional form on computer readable devices 220 that is selectively removable and may be loaded onto or transferred to data processing system 200 for running by processor unit 204. Program code 218 and computer readable devices 220 form computer program product 222. In one example, computer readable devices 220 may be computer readable storage device 224 or computer readable signal. Computer readable storage device 224 may include, for example, an optical or magnetic disc that is inserted or placed into a drive or other device that is part of persistent storage 208 for transfer onto a storage device, such as a hard drive, that is part of persistent storage 208. Computer readable storage device 224 also may take the form of a persistent storage, such as a hard drive, a thumb drive, or a flash memory that is connected to data processing system 200. In some instances, computer readable storage device 224 may not be removable from data processing system 200.

As used herein, the term "computer-readable storage device" does not include a signal propagation media such as copper cable, optical fiber or wireless transmission media.

In some illustrative embodiments, program code 218 may be downloaded over a network to persistent storage 208 from another device or data processing system for use within data processing system 200. For instance, program code stored in a computer readable storage device in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable device 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable device may be any device that can contain, store, communicate, propagate, or transport the program for use by or in connection with the instruction running system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

Figure 3:
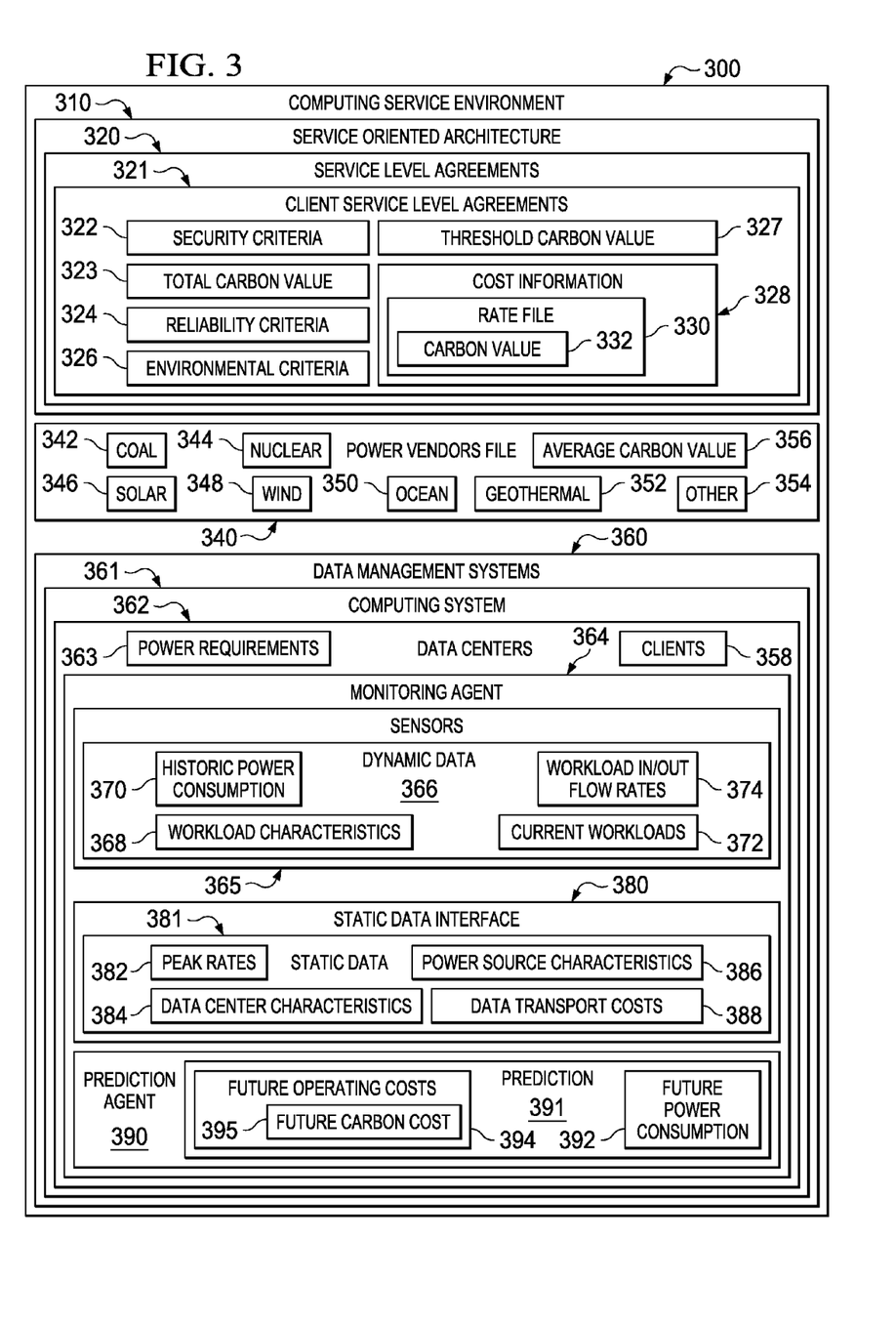
FIG. 3 is a computing service environment in which illustrative embodiments may be implemented.

With reference now to FIG. 3, a computing service environment is disclosed in which illustrative embodiments may be implemented. In an embodiment, computing service environment 300 comprises service oriented architecture 310, power vendors 340, and data management systems 360. Service oriented architecture 310 comprises service level agreements 320. Service level agreements 320 comprise a number of individual service level agreements such as client service level agreements 321. Clients may be consumers of computing services in service oriented architecture 310. Clients contract for computing services in service oriented architecture 310 through client service level agreements such as client service level agreements 321. Client service level agreements 321 may comprise security criteria 322, total carbon value 323, reliability criteria 324, environmental criteria 326, cost information 328, and threshold carbon value 327. In an embodiment, threshold carbon value 327 may be included in environmental criteria 326. Threshold carbon value 327 represents a value that cannot be exceeded in providing computing services to the client by a data center without triggering a consequence specified in the client service level agreement, cost information 328 comprises rate file 330. Rate file 320 comprises carbon value 332. Carbon value 332 may be one of a cost per unit of carbon dioxide produced in the manufacture of the energy sold by the energy provider and a numerical value indicating a degree of environmental impact reasonably attributable to the production of the carbon dioxide. For example, permits to emit carbon dioxide from a power plant in the United States have been sold for $3.38 per ton at a United States greenhouse gas emissions auction and such a permit value may be used to indicate a monetary value of the carbon dioxide produced in the manufacture of the energy. As used herein, the term "carbon value" means a numerical value related to an amount of carbon dioxide created by production of a unit of energy for a type of energy production, and may be expressed as either a numerical value representing an environmental impact of the carbon dioxide produced in the production of each unit of energy or a monetary value representing a cost associated with the carbon dioxide produced in the production of each unit of energy.

Power vendors file 340 comprises a number of energy production methods that may include one or more of coal 342, nuclear 344, solar 346, wind 348, ocean 350, geothermal 352 and other 354. Power vendors file 340 also comprises average carbon value 356. Average carbon value 356 may be an average of each carbon value for each type of energy production method used by a power vendor. Data management systems 360 comprise computing system 361. Computing system 361 comprises data centers 362. Data centers 362 comprise power requirements 363, clients 358 and monitoring agent 364. Monitoring agent 364 comprises sensors 365, static data interface 380, and prediction agent 390. Sensors 365 comprise dynamic data 366. Dynamic data 366 comprises workload characteristics 368, historic power consumption 370, current workloads 372, and workflow in/out flow rates 374. The different advantageous embodiments recognize and take into account that dynamic data is gathered automatically as the data center operates, and includes workload characteristics, histories of power consumption relative to time of day, number of active workloads, and emigration patterns of workloads in and out of the data center.

Static data interface 380 comprises static data 381. Static data 381 comprises peak rates 382, data center characteristics 384, power source characteristics 386, and data transport costs 388. The different advantageous embodiments recognize and take into account that static data is entered as needed by data center personnel, and includes information about power rates and sources from the power companies. The different advantageous embodiments recognize and take into account that static data may include a configuration of the data center itself and data transportation costs to and from other data centers. Prediction agent 390 comprises predictions 391. Predictions 391 comprise future power consumption 392 and future operating costs 394. Future operating costs may comprise future carbon cost 395. The different advantageous embodiments recognize and take into account that static and dynamic data may be combined to produce predictions of future data center metrics. The different advantageous embodiments recognize and take into account that current data center-level profiles only account for the number and/or performance of servers they contain and, possibly, the total power requirement of the facility. This information is useful for determining what workloads may run on the available hardware but lacks information necessary for determining the lowest total cost method of running a workload. Current solutions are static and don't account for the source of energy. For example, current solutions do not account for whether energy is generated by a coal plant or by a solar farm. Moreover, current solutions do not take into account the total cost of acquiring that energy because total cost calculations do not take into account a cost associated with carbon dioxide produced in production of the energy. The different advantageous embodiments recognize and take into account that a carbon value associated with energy consumed in providing a given amount of data processing services will vary if the energy produced originates from a solar farm or if the energy originates from a coal fired plant. Also, costs associated with providing a given amount of data processing services vary during peak times and during off-peak times, and metrics capturing such varying costs are needed for scheduling data center workloads to provide services to clients at the lowest costs. The various advantageous embodiments take into account carbon dioxide costs of energy production, total energy costs at different times of day, and projections of future costs based on statistical analysis of past energy consumption by past workloads. The advantageous embodiments take into account that carbon dioxide costs may be used to provide intelligent workload migration tools.

The different advantageous embodiments recognize and take into account that future data center metrics may include future power consumption future operating costs, and future data center workload. The different advantageous embodiments recognize and take into account that data is entered into a database application or incorporated into an existing solution such that the profile may be retrieved an arbitrary number of times via a network connection. The different advantageous embodiments recognize and take into account that a new iteration of data center level profiles are needed that include information on the source of the energy, the local market price for all times of the day, and statistical projections of future energy needs based on past consumption and workload data. The different advantageous embodiments recognize and take into account the advantage of a system containing the foregoing information is that a total energy cost can be calculated including factors such as a carbon value and energy availability over the course of the day. The different advantageous embodiments recognize and take into account that such a system enables existing and future tools to intelligently assess the total costs associated with using a specific data center at a given time.

The different advantageous embodiments recognize and take into account that current data center profiles do not recognize the source of energy provided to run the data center operations. The different advantageous embodiments recognize and take into account that current data center profiles do not recognize the total cost of acquiring the energy sold to the data centers to run the data center operations, when the environmental costs of carbon produced in energy production is taken into account. The different advantageous embodiments recognize and take into account that an intelligent assessment of a power profile of a data center includes total energy costs at different times of the day, statistical projections of future costs based on statistical analysis of past energy consumption and workloads. The different advantageous embodiments recognize and take into account that a total energy cost can be calculated that includes a carbon value, a source of energy, and energy availability over a course of the day.

The different advantageous embodiments recognize and take into account that green data can be used as marketing tool. The different advantageous embodiments recognize and take into account that data center management includes the cost to move workload from one data center to another due to costs in time and costs in transferring the workload. The different advantageous embodiments recognize and take into account that a data center may have several types of energy production used by a number of providers.

Figure 4:
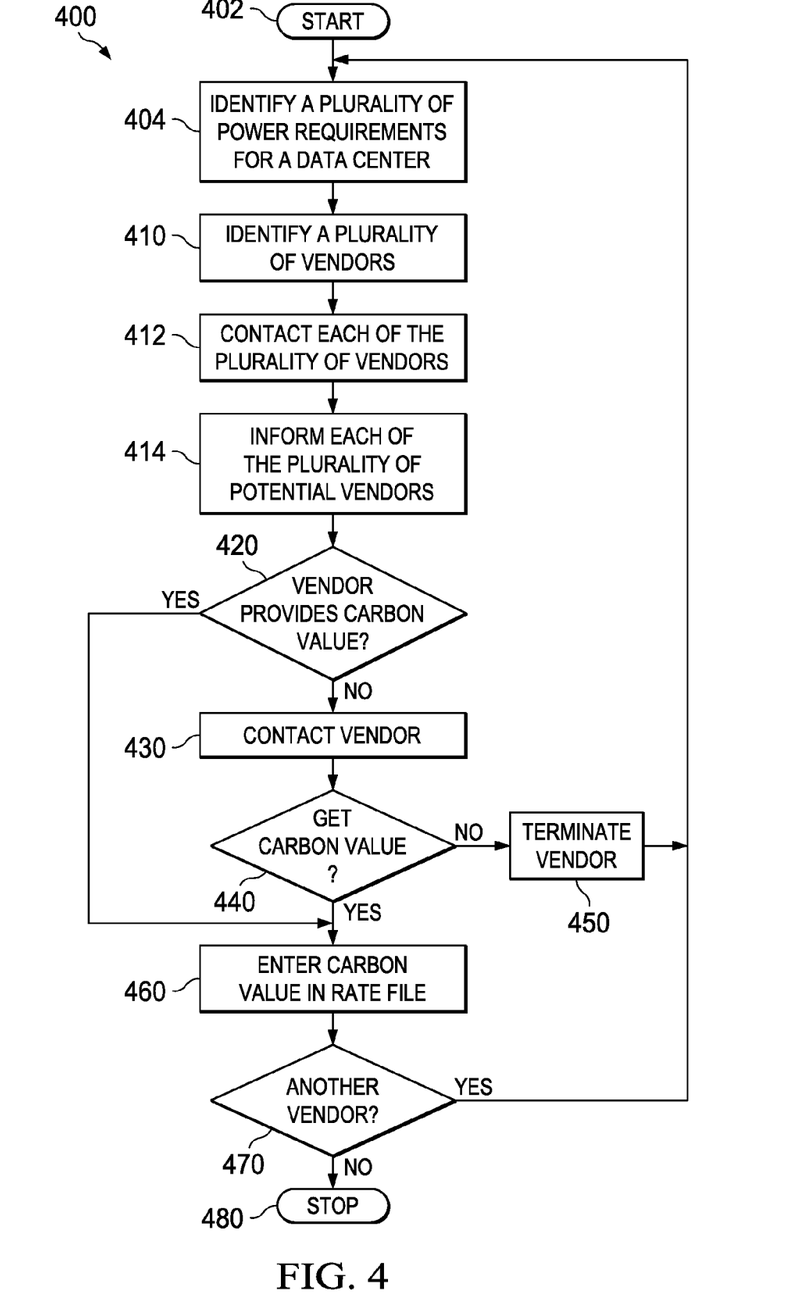
FIG. 4 is a flowchart of a vendor identification process in accordance with the illustrative embodiments.

With reference now to FIG. 4, a flowchart of a vendor identification process is depicted in accordance with the illustrative embodiments. Vendor identification process 400 begins (step 402) and identifies a plurality of power requirements for a data center (step 404). The plurality of power requirements may be power requirements 363 in FIG. 3. Vendor identification process 400 identifies a plurality of vendors, each of the plurality of vendors capable of supplying at least a portion of the plurality of power requirements (step 410). The plurality of power vendors may be power vendors file 340 in FIG. 3. Vendor identification process 400 contacts each of the plurality of vendors (step 412). Vendor identification process 400 informs each of the plurality of potential vendors that in order to qualify as a vendor with the data center, the potential vendor must provide a carbon value along with their cost per unit of energy, the carbon value being a numeral representing a quantity of carbon produced to generate a unit of energy (step 414). Vendor identification process 400 determines whether the vendor provides a carbon value per unit of energy (step 420). When the vendor provides a carbon value per unit of energy, the carbon value is entered in a rate file for the vendor (step 460). The rate file may be rate file 330 and the carbon value may be carbon values 332 in FIG. 3. When the vendor does not provide a carbon value per unit of energy, the vendor is contacted (step 430) and it is determined whether the vendor will supply a carbon value (step 440). If not, the vendor is terminated (step 450). If so, the carbon value is entered in the rate file (step 460). If there is another vendor (step 470), the process goes to step 410, and if not, stops (step 480).

Figure 5:
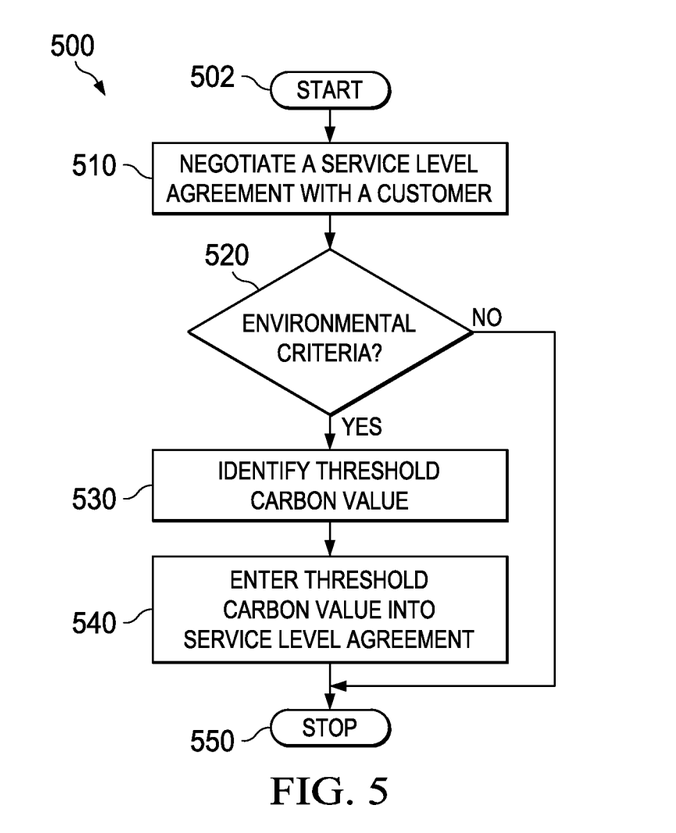
FIG. 5 is a flowchart of a service level agreement process in accordance with the illustrative embodiments.

With reference now to FIG. 5, a flowchart of a service level agreement process is disclosed in accordance with the illustrative embodiments. Service level agreement process 500 starts (step 502) and negotiates a service level agreement with a customer (step 510). The service level agreement may be service level agreement 321 in FIG. 3. Service level agreement process 500 determines whether an environmental criteria is part of the service level agreement (step 520). The environmental criteria may be environmental criteria 326 in FIG. 3. When an environmental criteria is part of the service level agreement, a threshold carbon value is identified (step 530). Responsive to determining the threshold carbon value, the process enters the threshold carbon value into the service level agreement (step 540), and service level agreement process 500 stops (step 550). The threshold carbon value may be threshold carbon value 327 in FIG. 3.

Figure 6:
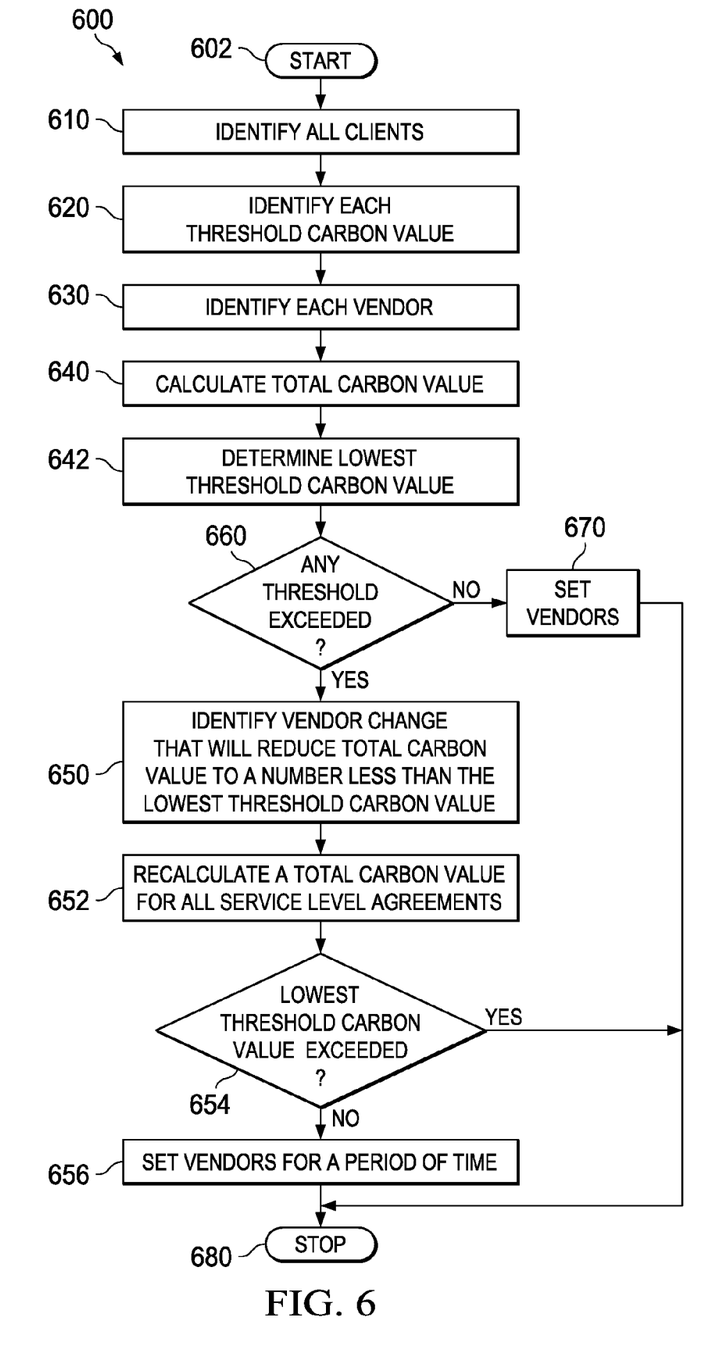
FIG. 6 is a flowchart of a first threshold evaluation process in accordance with the illustrative embodiments.

With reference now to FIG. 6, a flowchart of a first threshold evaluation process is disclosed in accordance with the illustrative embodiments. First threshold evaluation process 600 begins (step 602), identifies each of a plurality of clients of the data center (step 610), identifies each threshold carbon value for each of the plurality of clients (step 620), identifies each vendor supplying power to perform each service level agreement (step 630), and calculates a total carbon value for all service level agreements (step 640). The plurality of clients may be clients 358 in FIG. 3. The threshold carbon value may be threshold carbon value 327 in FIG. 3. The vendors may be power vendors file 340 in FIG. 3. The total carbon value may be total carbon values 323 in FIG. 3. First, threshold evaluation process 600 determines a lowest threshold carbon value (step 642). Then, threshold evaluation process 600 determines whether the total carbon value exceeds a lowest threshold carbon value of all of the service level agreements (step 660). When a determination is made that no threshold carbon value of any service level agreement has been exceeded, first threshold evaluation process 600 sets the vendor list (step 670) and stops (step 680). When a threshold carbon value of any service level agreement has been exceeded, first threshold evaluation process 600 identifies a vendor change that will reduce the total carbon value to a number less than the lowest threshold carbon value (step 650). Responsive to making a vendor change, first threshold evaluation process 600 re-calculates a total carbon value for all service level agreements (step 652). Responsive to re-calculating the total carbon value for all service level agreements, first threshold evaluation process 600 determines whether the lowest threshold carbon value is exceeded (step 654). Responsive to determining that the lowest threshold carbon value is not exceeded, first threshold evaluation process 600 sets the vendor list for a period of time (step 656) and stops (step 680).

Figure 7:
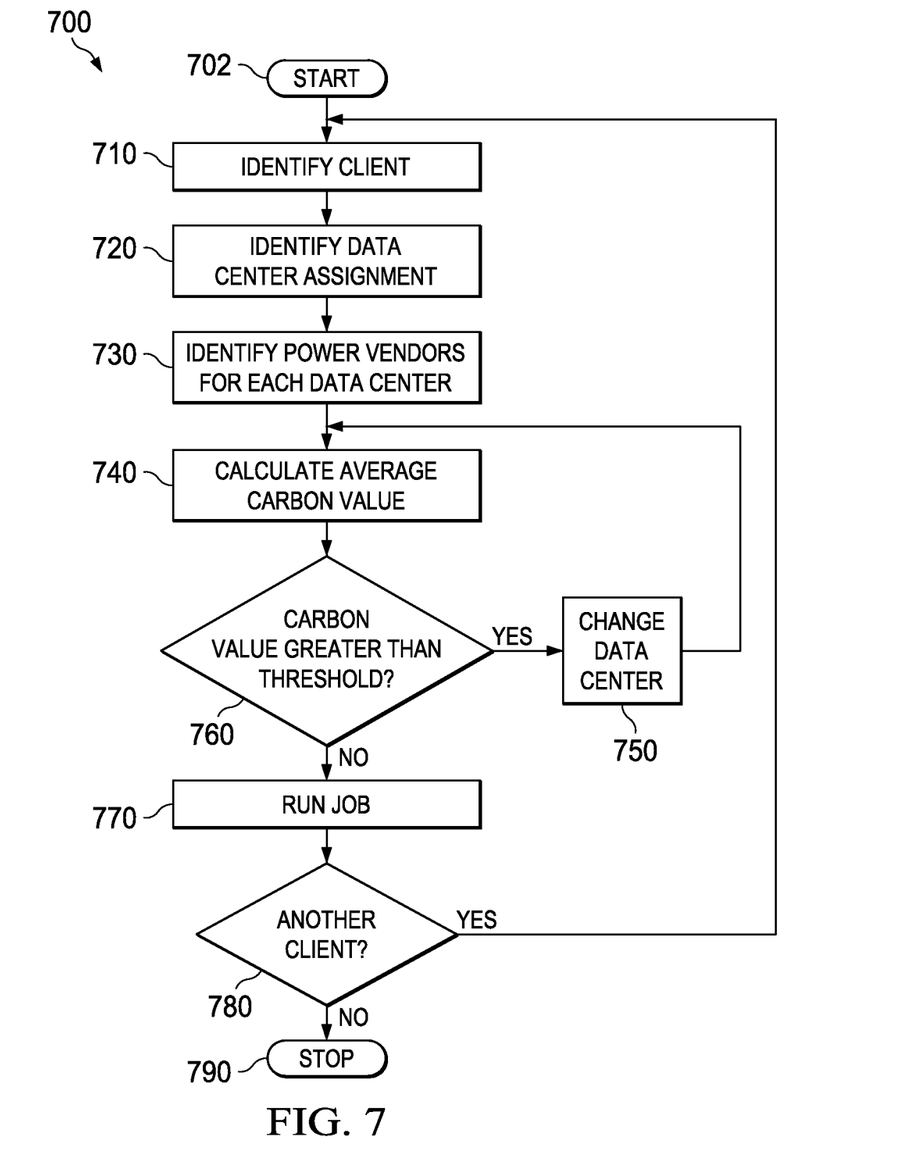
FIG. 7 is a flowchart of a second threshold evaluation process in accordance with the illustrative embodiments.

With reference now to FIG. 7, a flowchart of a second threshold evaluation process is disclosed in accordance with the illustrative embodiments. Second threshold evaluation process 700 begins (step 702), identifies a client (step 710), identifies a data center assignment for the client (step 720), identifies a plurality of power vendors for each data center (step 730), and calculates an average carbon value for all of the carbon values of the plurality of power vendors (step 740). Second threshold evaluation process 700 determines whether the average carbon value exceeds a threshold carbon value specified by the client in the service level agreement (step 760). The average carbon value may be average carbon value 356 in FIG. 3. When the threshold carbon value is exceeded, second threshold evaluation process 700 changes the data center to another data center (step 750). When the threshold is not exceeded, second threshold evaluation process 700 runs a job for the client (step 770). When there is another client (step 780), second threshold evaluation process goes to step 710, and when there is not another client, stops (step 790).

Figure 8:
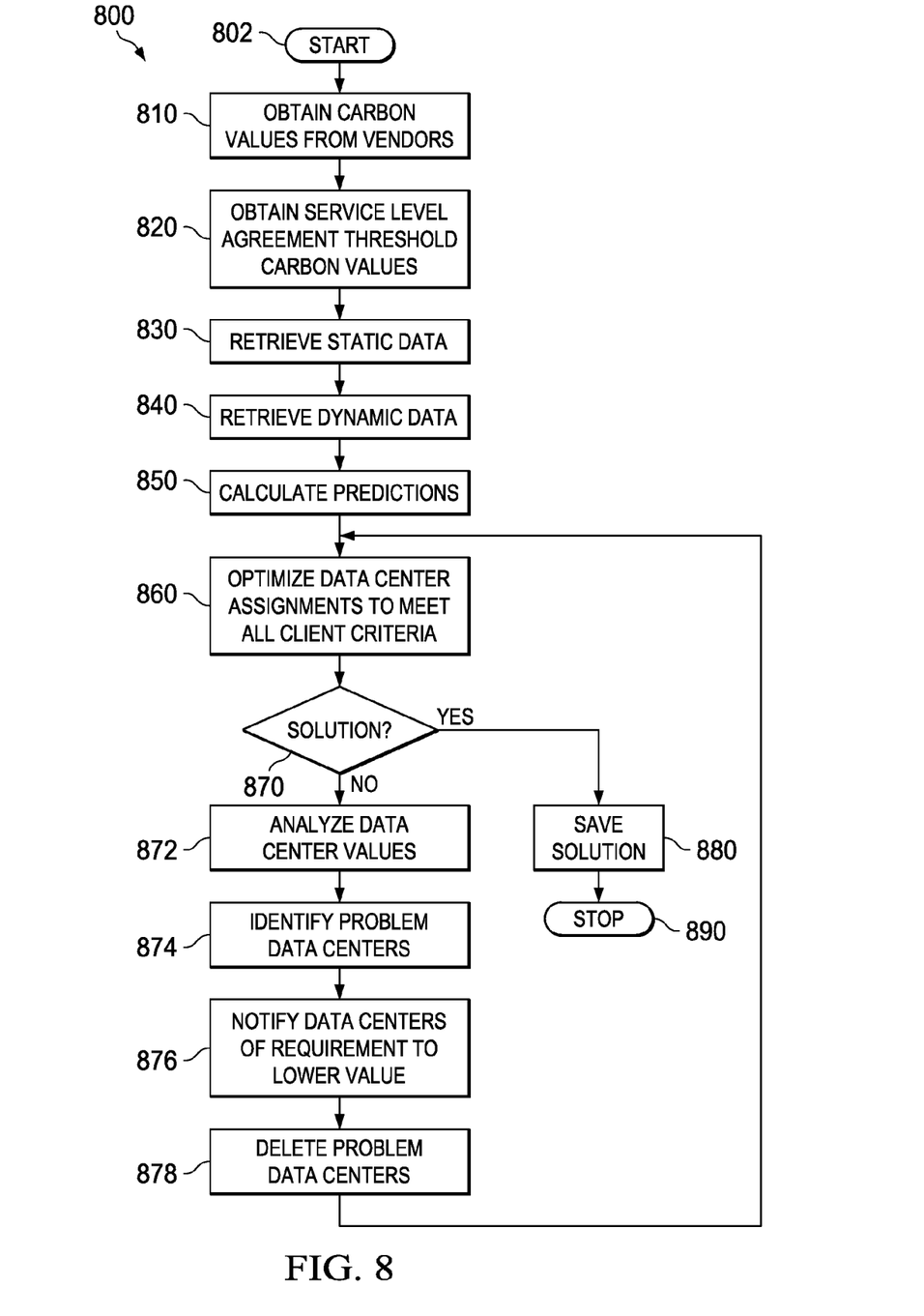
FIG. 8 is a flowchart of a data center optimization process in accordance with the illustrative embodiments.

With reference now to FIG. 8, a flowchart of a data center optimization process is disclosed in accordance with the illustrative embodiments. Data center optimization process 800 begins (step 802), obtains a plurality of carbon values from a plurality of vendors (step 810), obtains a plurality of service level agreement threshold carbon values (step 820), retrieves a plurality of static data from a computing system of the data center (step 830), retrieves a plurality of dynamic data from a monitoring system connected to the computing system (step 840), calculates a prediction (step 850), and optimizes, using the prediction, data center assignments to meet each threshold carbon value of each client (step 860). Carbon values obtained from a plurality of vendors (step 810) may be average carbon values 356 that may be stored in rate file 330 as carbon values such as carbon values 332 in FIG. 3. Static data may be static data 381 in FIG. 3. Dynamic data may be dynamic data 366 in FIG. 3. A prediction may be calculated by prediction agent 390 in FIG. 3. The prediction may be predictions 391 in FIG. 3 and include a prediction of one of future power consumption 392 and future operating costs 394. Data center optimization process 800 determines whether a solution has been reached (step 870). If a solution has not been reached, data center optimization process 800 analyzes a plurality of data center values (step 872), identifies one or more problem data centers (step 874), notifies each problem data center of a requirement to lower a carbon value of the data center (step 876), and deletes problem data centers (step 878). If a solution has been reached, the solution is saved (step 880), and data center optimization process 800 stops (step 890).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more runable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction running system. For the purposes of this description, a computer-usable or computer readable medium can be any tangible apparatus that can contain, store, communicate, propagate, or transport the program for use by or in connection with the instruction running system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or running program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing power supply to a data center, the method comprising the steps of:
    a computer determining a total carbon value for all power supplied to the data center from power vendors based on data supplied by the vendors correlating types of production of the power to respective carbon generation;
    the computer determining a lowest threshold carbon value specified in any of a plurality of service level agreements between the data center and a respective plurality of customers of the data center;
    the computer determining whether the total carbon value exceeds the lowest threshold carbon value;
    the computer, responsive to determining that the total carbon value exceeds the lowest threshold carbon value, identifying a change to the type of production of the power to the data center that will reduce the total carbon value to a number less than the lowest threshold carbon value.

2. The method of claim 1, further:
    the computer identifying a plurality of power requirements for running a plurality of resources at a data center;
    the computer identifying a plurality of potential vendors, each of the plurality of potential vendors capable of supplying at least a portion of the plurality of power requirements;
    the computer contacting each of the plurality of potential vendors;
    the computer informing each of the plurality of potential vendors that in order to qualify as a vendor with the data center, the potential vendor must provide a carbon value, the carbon value being a numeral representing a quantity of carbon produced by the potential vendor to generate a unit of energy, and the potential vendor must provide a cost of the potential vendor to generate the unit of energy;
    the computer determining whether each of the plurality of potential vendors has provided a carbon value; and
    the computer, responsive to determining that a potential vendor has provided a carbon value, entering the provided carbon value into a file for the potential vendor that has provided the carbon value.

3. The method of claim 2 further comprising:
    the computer negotiating a service level agreement with a customer;
    the computer determining whether an environmental criteria is part of the service level agreement;

the computer, responsive to determining that the environmental criteria is part of the service level agreement, identifying a threshold carbon value; and the computer, responsive to determining the threshold carbon value, entering the threshold carbon value into the service level agreement.

4. The method of claim 1 further comprising:

the computer identifying each of a plurality of clients of the data center;

the computer identifying a threshold carbon value for each of the plurality of clients;

the computer identifying a plurality of vendors supplying power, each of the vendors supplying power performing a service level agreement for at least one of the clients;

the computer calculating a total carbon value for all of the vendors supplying power;

the computer determining whether the total carbon value exceeds a lowest threshold carbon value of all of a plurality of service level agreements, each of the plurality of service level agreements corresponding to one of the clients; and the computer, responsive to determining that the lowest threshold carbon value has not been exceeded, setting a list of vendors for a period of time.

5. The method of claim 2 further comprising:

the computer identifying a client;

the computer identifying an assigned data center for the client;

the computer identifying a plurality of power vendors for the assigned data center;

the computer calculating an average carbon value of all carbon values of the plurality of power vendors;

the computer determining whether the average carbon value exceeds a threshold carbon value specified by the client in a service level agreement; and the computer, when the threshold carbon value is exceeded, changing the assigned data center to another data center.

6. The method of claim 2 further comprising:

the computer obtaining a plurality of carbon values from a plurality of vendors;

the computer obtaining a plurality of service level agreement threshold carbon values;

the computer retrieving a plurality of static data from a computing system of the data center;

the computer retrieving a plurality of dynamic data from a monitoring system connected to the computing system;

the computer calculating a prediction using the plurality of static data and the plurality of dynamic data; and the computer optimizing using the prediction, a plurality of data center assignments to meet a service level agreement threshold carbon value of each client of a plurality of clients of the data center.

7. The method of claim 2 further comprising:

the computer identifying a client;

the computer identifying an assigned data center for the client;

the computer identifying a plurality of power vendors for the assigned data center;

the computer calculating an average carbon value of all carbon values of the plurality of power vendors;

the computer determining whether the average carbon value exceeds a threshold carbon value specified by the client in a service level agreement; and the computer, when the threshold carbon value is not exceeded, running a job for the client.

8. The method of claim 1 further comprising: the computer identifying each of a plurality of clients of the data center; the computer identifying a threshold carbon value for each of the plurality of clients; the computer identifying a plurality of vendors supplying power, each of the vendors supplying power performing a service level agreement for at least one of the clients.

9. The method of claim 1 further comprising:

the computer, responsive to making a vendor change, re-calculating a total carbon value for all of the service level agreements;

the computer, responsive to re-calculating a total carbon value for all of the service level agreements, determining whether the lowest threshold carbon value is not exceeded; and the computer, responsive to determining that the lowest threshold carbon value is not exceeded, re-setting a vendor list for a period of time.

10. A system for providing data center services in accordance with an environmental requirement, the system comprising:

one or more processors, one or more computer readable memories, one or more computer readable storage devices, and program instructions, stored on at least one of the one or more computer readable storage devices for execution by at least one of the one or more processors via at least one of the one or memories, the program instructions comprising:

program instructions to acquire a plurality of dynamic data comprising a plurality of workload characteristics, a plurality of current workload data, a plurality of historic power consumption data, a plurality of workload inflow rates, and a plurality of workflow outflow rates;

program instructions to acquire from a static data interface a plurality of peak rate data, a plurality of power source characteristics, a plurality of data center characteristics, and a plurality of data transport costs; and program instructions to use a plurality of power vendor data, the plurality of dynamic data and a plurality of static data, to calculate a future power consumption and a future operating cost;

wherein the future operating cost includes a future carbon cost indicating an amount of carbon associated with satisfying the future power consumption.

11. The system of claim 10 further comprising:

program instructions, stored on at least one of the one or more computer readable storage devices for execution by at least one of the one or more processors via at least one of the one or memories, to identify a plurality of power requirements for running a plurality of resources at a data center;

program instructions, stored on at least one of the one or more computer readable storage devices for execution by at least one of the one or more processors via at least one of the one or memories, to identify a plurality of potential vendors, each of the plurality of potential vendors capable of supplying at least a portion of the plurality of power requirements;

program instructions, stored on at least one of the one or more computer readable storage devices for execution by at least one of the one or more processors via at least one of the one or memories, to contact each of the plurality of potential vendors;

program instructions, stored on at least one of the one or more computer readable storage devices for execution by at least one of the one or more processors via at least one of the one or memories, to inform each of the plurality of potential vendors that in order to qualify as a vendor with the data center, the potential vendor must provide a carbon value, the carbon value being a numeral representing a quantity of carbon produced by the potential vendor to generate a unit of energy, and the potential vendor must provide a cost of the potential vendor to generate the unit of energy;

program instructions, stored on at least one of the one or more computer readable storage devices for execution by at least one of the one or more processors via at least one of the one or memories, to determine whether each of the plurality of potential vendors has provided a carbon value; and program instructions, stored on at least one of the one or more computer readable storage devices for execution by at least one of the one or more processors via at least one of the one or memories, responsive to determining that a potential vendor has provided a carbon value, to enter the provided carbon value into a file for the potential vendor that has provided the carbon value.

12. The system of claim 10, further comprising:

program instructions, stored on at least one of the one or more computer readable storage devices for execution by at least one of the one or more processors via at least one of the one or memories, to determine whether environmental criteria are part of each of a plurality of service level agreements;

program instructions, stored on at least one of the one or more computer readable storage devices for execution by at least one of the one or more processors via at least one of the one or memories, responsive to determining that the environmental criteria are part of each of the plurality of service level agreements, to enter a threshold carbon value in each of the plurality of service level agreements;

program instructions, stored on at least one of the one or more computer readable storage devices for execution by at least one of the one or more processors via at least one of the one or memories, to identify each of a plurality of clients of a data center;

program instructions, stored on at least one of the one or more computer readable storage devices for execution by at least one of the one or more processors via at least one of the one or memories, to identify a threshold carbon value for each of the plurality of clients;

program instructions, stored on at least one of the one or more computer readable storage devices for execution by at least one of the one or more processors via at least one of the one or memories, to identify a plurality of vendors supplying power, each of the vendors supplying power performing a service level agreement for at least one of the clients;

program instructions, stored on at least one of the one or more computer readable storage devices for execution by at least one of the one or more processors via at least one of the one or memories, to calculate a total carbon value for all of the vendors supplying power;

program instructions, stored on at least one of the one or more computer readable storage devices for execution by at least one of the one or more processors via at least one of the one or memories, to determine whether the total carbon value exceeds a lowest threshold carbon value of all of a plurality of service level agreements, each of the plurality of service level agreements corresponding to one of the clients;

program instructions, stored on at least one of the one or more computer readable storage devices for execution by at least one of the one or more processors via at least one of the one or memories, responsive to determining that the lowest threshold carbon value has been exceeded, to identify a vendor change that will reduce the total carbon value to a number less than the lowest threshold carbon value;

program instructions, stored on at least one of the one or more computer readable storage devices for execution by at least one of the one or more processors via at least one of the one or memories, responsive to making a vendor change, to re-calculate a total carbon value for all of the service level agreements; and program instructions, stored on at least one of the one or more computer readable storage devices for execution by at least one of the one or more processors via at least one of the one or memories, responsive to re-calculating a total carbon value for all of the service level agreements and confirming that the lowest threshold carbon value is not exceeded, to set a list of vendors for a period of time.

13. The system of claim 10 further comprising:

program instructions, stored on at least one of the one or more computer readable storage devices for execution by at least one of the one or more processors via at least one of the one or memories, to identify a client;

program instructions, stored on at least one of the one or more computer readable storage devices for execution by at least one of the one or more processors via at least one of the one or memories, to identify an assigned data center for the client;

program instructions, stored on at least one of the one or more computer readable storage devices for execution by at least one of the one or more processors via at least one of the one or memories, to identify a plurality of power vendors for the assigned data center;

program instructions, stored on at least one of the one or more computer readable storage devices for execution by at least one of the one or more processors via at least one of the one or memories, to calculate an average carbon value of all carbon values of the plurality of power vendors;

program instructions, stored on at least one of the one or more computer readable storage devices for execution by at least one of the one or more processors via at least one of the one or memories, to determine whether the average carbon value exceeds a threshold carbon value specified by the client in a service level agreement;

program instructions, stored on at least one of the one or more computer readable storage devices for execution by at least one of the one or more processors via at least one of the one or memories, when the threshold is exceeded, to change the assigned data center to another data center; and program instructions, stored on at least one of the one or more computer readable storage devices for execution by at least one of the one or more processors via at least one of the one or memories, when the threshold is not exceeded, to run a job for the client.

14. A computer program product comprising:

one or more computer readable storage devices and program instructions, stored on at least one of the one or more computer readable storage devices, the program instructions comprising:

program instructions to determine whether environmental criteria are part of each of a plurality of service level agreements;

program instructions responsive to determining that the environmental criteria are part of each of the plurality of service level agreements, to identify a threshold carbon value in each of the plurality of service level agreements;

program instructions to identify each of a plurality of clients of a data center;

program instructions, to identify a threshold carbon value for each of the plurality of clients;

program instructions to identify a plurality of vendors supplying power, each of the vendors supplying power performing a service level agreement for at least one of the clients;

program instructions to calculate a total carbon value for all of the vendors supplying power;

program instructions to determine whether the total carbon value exceeds a lowest threshold carbon value of all of a plurality of service level agreements, each of the plurality of service level agreements corresponding to one of the clients;

program instructions, responsive to determining that the lowest threshold carbon value has been exceeded, to identify a vendor change that will reduce the total carbon value to a number less than the lowest threshold carbon value;

program instructions, responsive to making a vendor change, to re-calculate a total carbon value for all of the service level agreements; and program instructions, responsive to re-calculating the total carbon value for all of the service level agreements and confirming that the lowest threshold carbon value is not exceeded, to set a list of vendors for a period of time.

15. The computer program product of claim 14, further:

program instructions, stored on at least one of the one or more computer readable storage mediums, to identify a plurality of power requirements for running a plurality of resources at a data center;

program instructions, stored on at least one of the one or more computer readable storage mediums, to identify a plurality of potential vendors, each of the plurality of potential vendors capable of supplying at least a portion of the plurality of power requirements;

program instructions, stored on at least one of the one or more computer readable storage mediums, to contact each of the plurality of potential vendors;

program instructions, stored on at least one of the one or more computer readable storage mediums, to inform each of the plurality of potential vendors that in order to qualify as a vendor with the data center, the potential vendor must provide a carbon value, the carbon value being a numeral representing a quantity of carbon produced by the potential vendor to generate a unit of energy, and the potential vendor must provide a cost of the potential vendor to generate the unit of energy;

program instructions, stored on at least one of the one or more computer readable storage mediums, to determine whether each of the plurality of potential vendors has provided a carbon value; and program instructions, stored on at least one of the one or more computer readable storage mediums, responsive to determining that a potential vendor has provided a carbon value, to enter the provided carbon value file for the potential vendor that has provided the carbon value.

16. The computer program product of claim 15 further comprising:

program instructions, stored on at least one of the one or more computer readable storage mediums, to identify a client;

program instructions, stored on at least one of the one or more computer readable storage mediums, to identify an assigned data center for the client;

program instructions, stored on at least one of the one or more computer readable storage mediums, to identify a plurality of power vendors for the assigned data center;

program instructions, stored on at least one of the one or more computer readable storage mediums, to calculate an average carbon value of all carbon values of the plurality of power vendors;

program instructions, stored on at least one of the one or more computer readable storage mediums, to determine whether the average carbon value exceeds a threshold carbon value specified by the client in a service level agreement;

program instructions, stored on at least one of the one or more computer readable storage mediums, when the threshold is exceeded, to change the assigned data center to another data center; and program instructions, stored on at least one of the one or more computer readable storage mediums, when the threshold is not exceeded, to run a job for the client.

17. A method for providing data center services in accordance with an environmental requirement, the method comprising:

acquiring a plurality of dynamic data comprising a plurality of workload characteristics, a plurality of current workload data, a plurality of historic power consumption data, a plurality of workload inflow rates, and a plurality of workflow outflow rates;

acquiring from a static data interface a plurality of peak rate data, a plurality of power source characteristics, a plurality of data center characteristics, and a plurality of data transport costs; and using a plurality of power vendor data, the plurality of dynamic data and a plurality of static data, to calculate a future power consumption and a future operating cost;

wherein the future operating cost includes a future carbon cost indicating an amount of carbon associated with satisfying the future power consumption.

18. The method of claim 17 further comprising:

identifying a plurality of power requirements for running a plurality of resources at a data center;

identifying a plurality of potential vendors, each of the plurality of potential vendors capable of supplying at least a portion of the plurality of power requirements;

contacting each of the plurality of potential vendors;

informing each of the plurality of potential vendors that in order to qualify as a vendor with the data center, the potential vendor must provide a carbon value, the carbon value being a numeral representing a quantity of carbon produced by the potential vendor to generate a unit of energy, and the potential vendor must provide a cost of the potential vendor to generate the unit of energy;

determining whether each of the plurality of potential vendors has provided a carbon value; and responsive to determining that a potential vendor has provided a carbon value, entering the provided carbon value into a file for the potential vendor that has provided the carbon value.

19. The method of claim 17, further comprising:

determining whether environmental criteria are part of each of a plurality of service level agreements;

responsive to determining that the environmental criteria are part of each of the plurality of service level agreements, entering a threshold carbon value in each of the plurality of service level agreements;

identifying each of a plurality of clients of a data center;
identifying a threshold carbon value for each of the plurality of clients;
identifying a plurality of vendors supplying power, each of the vendors supplying power performing a service level agreement for at least one of the clients;
calculating a total carbon value for all of the vendors supplying power;
determining whether the total carbon value exceeds a lowest threshold carbon value of all of a plurality of service level agreements, each of the plurality of service level agreements corresponding to one of the clients;
responsive to determining that the lowest threshold carbon value has been exceeded, identifying a vendor change that will reduce the total carbon value to a number less than the lowest threshold carbon value;
responsive to making a vendor change, re-calculating a total carbon value for all of the service level agreements; and
responsive to re-calculating a total carbon value for all of the service level agreements and confirming that the lowest threshold carbon value is not exceeded, setting a list of vendors for a period of time.

20. The method of claim 17 further comprising:
identifying a client;
identifying an assigned data center for the client;
identifying a plurality of power vendors for the assigned data center;
calculating an average carbon value of all carbon values of the plurality of power vendors;
determining whether the average carbon value exceeds a threshold carbon value specified by the client in a service level agreement;
when the threshold is exceeded, changing the assigned data center to another data center; and
when the threshold is not exceeded, running a job for the client.

* * * * *